(12) United States Patent
Manuel et al.

(10) Patent No.: US 8,281,840 B2
(45) Date of Patent: Oct. 9, 2012

(54) CORRECTION FOR ASYMMETRICAL BUFFING

(75) Inventors: Stephen Manuel, Flat Rock, NC (US); Robert Young, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 350 days.

(21) Appl. No.: 12/666,644

(22) PCT Filed: Jun. 28, 2007

(86) PCT No.: PCT/US2007/072376
§ 371 (c)(1),
(2), (4) Date: Dec. 23, 2009

(87) PCT Pub. No.: WO2009/002344
PCT Pub. Date: Dec. 31, 2008

(65) Prior Publication Data
US 2010/0326603 A1    Dec. 30, 2010

(51) Int. Cl.
*B29D 30/68*    (2006.01)
*B24B 49/00*    (2012.01)
(52) U.S. Cl. .......................................... 157/13
(58) Field of Classification Search ..................... 157/13; 451/5, 26, 456
See application file for complete search history.

(56) References Cited

U.S. PATENT DOCUMENTS

| | | | |
|---|---|---|---|
| 3,553,903 A | 1/1971 | Christie | |
| 3,574,973 A * | 4/1971 | Rader | 451/26 |
| 3,633,279 A | 1/1972 | Frazier et al. | |
| 3,675,706 A | 7/1972 | Cahill | |
| 3,724,137 A | 4/1973 | Hofelt, Jr. et al. | |
| 3,941,178 A * | 3/1976 | Simpson et al. | 157/13 |
| 4,062,716 A | 12/1977 | Galantine et al. | |
| 4,084,350 A * | 4/1978 | Ongaro | 451/5 |
| 4,126,171 A | 11/1978 | Sorenson | |
| 4,736,546 A | 4/1988 | Ugo | |
| 4,914,869 A * | 4/1990 | Bayonnet et al. | 451/5 |
| 5,005,628 A | 4/1991 | Kinuhara et al. | |
| 5,022,186 A * | 6/1991 | Rogers, Jr. | 451/1 |
| 5,067,539 A | 11/1991 | Kinuhata et al. | |
| 5,103,595 A | 4/1992 | Dale et al. | |

(Continued)

FOREIGN PATENT DOCUMENTS

EP    1 189 014 A2    3/2002

(Continued)

OTHER PUBLICATIONS

PCT/US2007/065522 International Search Report and Written Opinion, Form PCT/ISA/237.

(Continued)

*Primary Examiner* — David B Thomas
(74) *Attorney, Agent, or Firm* — Hahn Loeser & Parks LLP; Bret A. Hrivnak, Esq.

(57) ABSTRACT

Methods, apparatus and computer programs for correcting a buff of tread from a crown of a tire, the steps of the method including measuring the distance between the tire crown surface and the belt at each of the plurality of locations; calculating a projected distance between the crown surface and the belt at each of the plurality of transverse locations across the crown using proposed buff radii, choosing a new position of the buffing radius origin from the one or more proposed origin positions; and buffing the tread from the tire crown along the arc described by the buff radius having the buffing radius origin at the new position.

18 Claims, 16 Drawing Sheets

U.S. PATENT DOCUMENTS

| | | | |
|---|---|---|---|
| 5,216,372 A | 6/1993 | Zoughi et al. | |
| 5,238,041 A | 8/1993 | Tomita et al. | |
| 5,307,854 A | 5/1994 | Brewer | |
| 5,941,338 A | 8/1999 | Miller et al. | |
| 6,005,397 A | 12/1999 | Zoughi et al. | |
| 6,086,452 A * | 7/2000 | Lipczynski et al. | 451/5 |
| 6,092,295 A | 7/2000 | Parrish | |
| 6,251,204 B1 | 6/2001 | Andersson et al. | |
| 6,386,024 B1 | 5/2002 | Marck et al. | |
| 6,386,945 B1 * | 5/2002 | Fahringer et al. | 451/5 |
| 6,405,146 B1 * | 6/2002 | Engel | 702/105 |
| 6,745,809 B1 | 6/2004 | Mory et al. | |
| 6,773,334 B1 | 8/2004 | Mallison | |
| 7,040,371 B2 | 5/2006 | Mory et al. | |
| 2002/0088527 A1 | 7/2002 | Tanaka et al. | |
| 2002/0106252 A1 | 8/2002 | Tsuzuki et al. | |
| 2002/0170652 A1 | 11/2002 | Parrish et al. | |
| 2004/0073339 A1 | 4/2004 | Ruoppolo | |
| 2004/0200579 A1 | 10/2004 | Mory et al. | |
| 2007/0004319 A1 | 1/2007 | Poling, Sr. et al. | |
| 2010/0261412 A1 * | 10/2010 | Manuel et al. | 451/5 |

FOREIGN PATENT DOCUMENTS

| | | |
|---|---|---|
| EP | 1 946 914 A1 | 7/2008 |
| JP | 2003-510188 A | 3/2003 |
| JP | 2006-192795 A | 7/2006 |
| WO | 01/23136 A1 | 4/2001 |
| WO | 2005/014267 A1 | 2/2005 |
| WO | 2007/029501 A1 | 3/2007 |

OTHER PUBLICATIONS

PCT/US2007/072376 International Search Report and Written Opinion, Form PCT/ISA/210/220.

PCT/US2007/072369 International Search Report, Form PCT/ISA/210/220.

PCT/US2007/065522 international Search Report, Form PCT/ISA 210.

PCT/US2007/072369 International Written Opinion, Form PCT/ISA/237 dated Dec. 5, 2007.

PCT/US2007/072500 International Search Report Form PCT/ISA/210 dated Aug. 19, 2008.

PCT/US2007/072500 International Written Opinion Form PCT/ISA/237 dated Aug. 19, 2008.

PCT/US2007/079954 International Search Report, Form PCT/ISA/220 dated Jul. 31, 2008.

PCT/US2007/079954 International Written Opinion, Form PCT/ISA/237 dated Jul. 31, 2008.

JP 2006-192795 A—English abstract obtained from Espacenet (http://worldwide.espacenet.com) accessed on Feb. 21, 2012, 1 page.

JP 2003-510188 A—English abstract obtained from Espacenet (http://worldwide.espacenet.conn) accessed on Feb. 3, 2012, 1 page.

WO 2007/029501 A1—English abstract obtained from Espacenet (http://worldwide.espacenet.com) accessed on Feb. 3, 2012, 1 page.

* cited by examiner

| | DISTANCE (mm) | RESPONSE SIGNAL (mamps) |
|---|---|---|
| 1 | 0 | 0.77 |
| 2 | 1 | 1.98 |
| 3 | 2 | 3.05 |
| 4 | 3 | 4.23 |
| 5 | 4 | 5.44 |
| 6 | 5 | 6.69 |
| 7 | 6 | 8.74 |

| LOCATION ALONG TREAD | 1 | 2 | 3 | 4 | 5 | |
|---|---|---|---|---|---|---|
| | | TREAD DEPTH (mm) OR DISTANCE BETWEEN BELT AND SENSOR (mm) | | | | |
| AT INITIAL BUFF RADIUS | 7.0 | 6.7 | 6.5 | 6.3 | 6.5 | |
| TARGET | 7.0 | 7.0 | 7.0 | 7.0 | 7.0 | |
| DIFFERENCE | 0 | -0.3 | -0.5 | -0.7 | -0.5 | |
| SQUARED DIFFERENCE | 0 | 0.09 | 0.25 | 0.49 | 0.25 | 1.08 |
| | | | | | | SUM |

FIG. 7

| LOCATION ALONG TREAD | TREAD DEPTH (mm) OR DISTANCE BETWEEN BELT AND SENSOR (mm) | | | | | |
|---|---|---|---|---|---|---|
| | 1 | 2 | 3 | 4 | 5 | |
| AT ITERATED BUFF RADIUS | 7.0 | 7.0 | 6.9 | 6.9 | 6.8 | |
| TARGET | 7.0 | 7.0 | 7.0 | 7.0 | 7.0 | |
| DIFFERENCE | 0 | 0 | -0.1 | -0.1 | -0.2 | |
| SQUARED DIFFERENCE | 0 | 0 | 0.01 | 0.01 | 0.04 | 0.06 |
| | | | | | | SUM |

FIG. 8

| LOCATION ALONG TREAD | TREAD DEPTH (mm) OR DISTANCE BETWEEN BELT AND SENSOR (mm) | | | | | |
|---|---|---|---|---|---|---|
| | 1 | 2 | 3 | 4 | 5 | |
| AT INITIAL BUFF RADIUS | 7.05 | 6.98 | 6.96 | 6.90 | 6.87 | |
| TARGET | 7.0 | 7.0 | 7.0 | 7.0 | 7.0 | |
| DIFFERENCE | 0.05 | -0.02 | -0.04 | -0.10 | -0.13 | |
| SQUARED DIFFERENCE | 0.003 | 0.004 | 0.0016 | 0.0100 | 0.0169 | 0.0314 SUM |

FIG. 10

| LOCATION ALONG TREAD | TREAD DEPTH (mm) OR DISTANCE BETWEEN BELT AND SENSOR (mm) | | | | | |
|---|---|---|---|---|---|---|
| | 1 | 2 | 3 | 4 | 5 | |
| AT ITERATED BUFF RADIUS | 6.89 | 6.98 | 6.97 | 6.95 | 6.93 | |
| TARGET | 7.0 | 7.0 | 7.0 | 7.0 | 7.0 | |
| DIFFERENCE | -0.02 | -0.02 | -0.03 | -0.05 | -0.07 | |
| SQUARED DIFFERENCE | 0.0004 | 0.0004 | 0.0009 | 0.0025 | 0.0049 | 0.0091 |
| | | | | | | SUM |

FIG. 11

| LOCATION ALONG TREAD | 1 | 2 | 3 | 4 | TREAD DEPTH (mm) OR DISTANCE BETWEEN BELT AND SENSOR (mm) 5 | 6 | 7 | 8 | 9 | |
|---|---|---|---|---|---|---|---|---|---|---|
| AT INITIAL BUFF RADIUS | 7.09 | 7.07 | 7.03 | 7.01 | 6.97 | 6.95 | 6.92 | 6.88 | 6.83 | |
| TARGET | 7.0 | 7.0 | 7.0 | 7.0 | 7.0 | 7.0 | 7.0 | 7.0 | 7.0 | |
| DIFFERENCE | 0.09 | 0.07 | 0.03 | 0.01 | -0.03 | -0.05 | -0.08 | -0.12 | -0.17 | |
| SQUARED DIFFERENCE | 0.0081 | 0.0049 | 0.0009 | 0.0001 | 0.0009 | 0.0025 | 0.0064 | 0.0144 | 0.0289 | 0.0671 SUM |

FIG. 13

| LOCATION ALONG TREAD | 1 | 2 | 3 | 4 | 5 | 6 | 7 | 8 | 9 | |
|---|---|---|---|---|---|---|---|---|---|---|
| | \multicolumn{9}{c|}{TREAD DEPTH (mm) OR DISTANCE BETWEEN BELT AND SENSOR (mm)} | |
| AT ITERATED BUFF RADIUS | 7.11 | 7.08 | 7.05 | 7.03 | 7.01 | 7.00 | 6.98 | 6.94 | 6.92 | |
| TARGET | 7.0 | 7.0 | 7.0 | 7.0 | 7.0 | 7.0 | 7.0 | 7.0 | 7.0 | |
| DIFFERENCE | 0.11 | 0.08 | 0.05 | 0.03 | 0.01 | 0 | -0.02 | -0.06 | -0.08 | |
| SQUARED DIFFERENCE | 0.0121 | 0.0064 | 0.0025 | 0.0009 | 0.0001 | 0 | 0.0004 | 0.0036 | 0.0064 | 0.0324 |
| | | | | | | | | | | SUM |

FIG. 14

CORRECTION FOR ASYMMETRICAL BUFFING

This application is a National Stage application of PCT Application No. PCT/US2007/072376, filed Jun. 28, 2007, to which this application claims priority and the benefit of, the disclosure of which is also hereby incorporated by reference.

BACKGROUND OF THE INVENTION

1. Field of the Invention

This invention relates generally to tire retreading and more specifically, to buffing machines for buffing tread from a crown of the tire.

2. Description of the Related Art

Tires are known to comprise a tread consisting of an outer layer of rubber-based mixtures, of greater or lesser thickness, in which are molded various grooves and tread patterns intended, inter alia, to improve the vehicle's grip relative to the ground.

In certain cases, it is necessary to machine or remove the outer surface of the tire, for example, the tire tread, for the purpose of preparing a worn tire for retreading. Typically, tire tread removal has been accomplished by the buffing head of the machine, the buffing head being one of various types of abrading devices, such as rasps, grinding wheels, and wire brushes. Another process used for tire tread removal is a cutting process that utilizes a cylindrical cutter called a "peeler."

During the tread removal process, it may be desirable to monitor the amount of material remaining above the belt so that the removal device does not contact or damage the belt, which, if occurring would destroy the tire. Therefore, removal devices may use various types of sensors to monitor the amount of material remaining above the belt during the tread removal process. Such sensors are well known to those having ordinary skill in the art and an example of one is fully disclosed in U.S. Pat. No. 6,386,024, which is hereby fully incorporated by reference.

SUMMARY OF THE INVENTION

Particular embodiments of the present invention include methods, computer program products and apparatus for buffing a tire. Such buffing is performed to prepare the tire for a retreading process. Particular embodiments of methods of the present invention, that are methods for correcting a buff of a tread from a crown of a tire that has been buffed asymmetrically, have steps that include receiving a signal from a sensor, the sensor scanning a transverse path across a portion of the crown of the tire, the signal being received from each of a plurality of transverse locations across the portion of the tire crown, the signal being generated by the sensor as a function of a distance between the tire crown surface and a belt in the tire. Other steps include interpreting the sensor signal as a measured distance between the tire crown surface and the belt at each of the plurality of locations and selecting one or more proposed origin positions for a new buffing radius, wherein each of the proposed origin positions are not on a centerline of the tire.

Particular embodiments of such methods may further include the step of calculating a projected distance between the crown surface and the belt at each of the plurality of transverse locations across the crown, wherein each projected distance is based upon an arc described by the buffing radius having the one or more proposed origin positions. Other steps may include choosing a new origin position for the new buffing radius from the one or more proposed origin positions and buffing the tread from the tire crown along the arc described by the new buff radius.

Particular embodiments of the present invention further include a tire buffing machine for correcting a buff of tread from the crown of a tire. Such buffing machines include a sensor that provides a sensor output signal that is a function of a distance between the tire crown surface and a belt in the tire, a buffing head for buffing the tire, and a controller having a processor and a memory storage device that stores instructions executable by the processor, such executable instructions including instructions for performing the methods described above. In particular embodiments, the sensor is operably mounted in fixed relation to the buffing head.

Particular embodiments of the present invention include a tire buffing machine for buffing tread from a crown of a tire, the machine having a sensor that provides a sensor output signal that is a function of a distance between the tire crown surface and a belt in the tire, the sensor being operably mounted in fixed relation to the buffing head and a buffing head for buffing the tire. The machine further includes a controller, the controller comprising a processor and a memory storage device that stores instructions executable by the processor, such executable instructions including instructions to control the contact between the crown of the tire and the buffing head as well as determining instructions executable by the processor for determining a location of the sensor relative to a centerline of the tire based upon the fixed relation of the sensor to the buffing head.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIG. 5A is a table showing a plurality of signal responses with corresponding distances according to an embodiment of the invention.

FIG. 7 is a table showing the differences between the tread thicknesses resulting from an initial buff radius for the tire of FIG. 6 and the target tread thicknesses.

FIG. 8 is a table showing the differences between the tread thicknesses resulting from an iterated buff radius for the tire of FIG. 6 and the target tread thicknesses.

FIG. 10 is a table showing the differences between the tread thicknesses resulting from an initial buff radius for the tire of FIG. 9 and the target tread thicknesses.

FIG. 11 is a table showing the differences between the tread thicknesses resulting from an iterated buff radius for the tire of FIG. 9 and the target tread thicknesses.

FIG. 13 is a table showing the differences between the tread thicknesses resulting from an initial buff radius having an initial origin for the tire of FIG. 12 and the target tread thicknesses.

FIG. 14 is a table showing the differences between the tread thicknesses resulting from a buff radius having an iterated origin for the tire of FIG. 12 and the target tread thicknesses.

DETAILED DESCRIPTION OF PARTICULAR EMBODIMENTS

Figure 1:
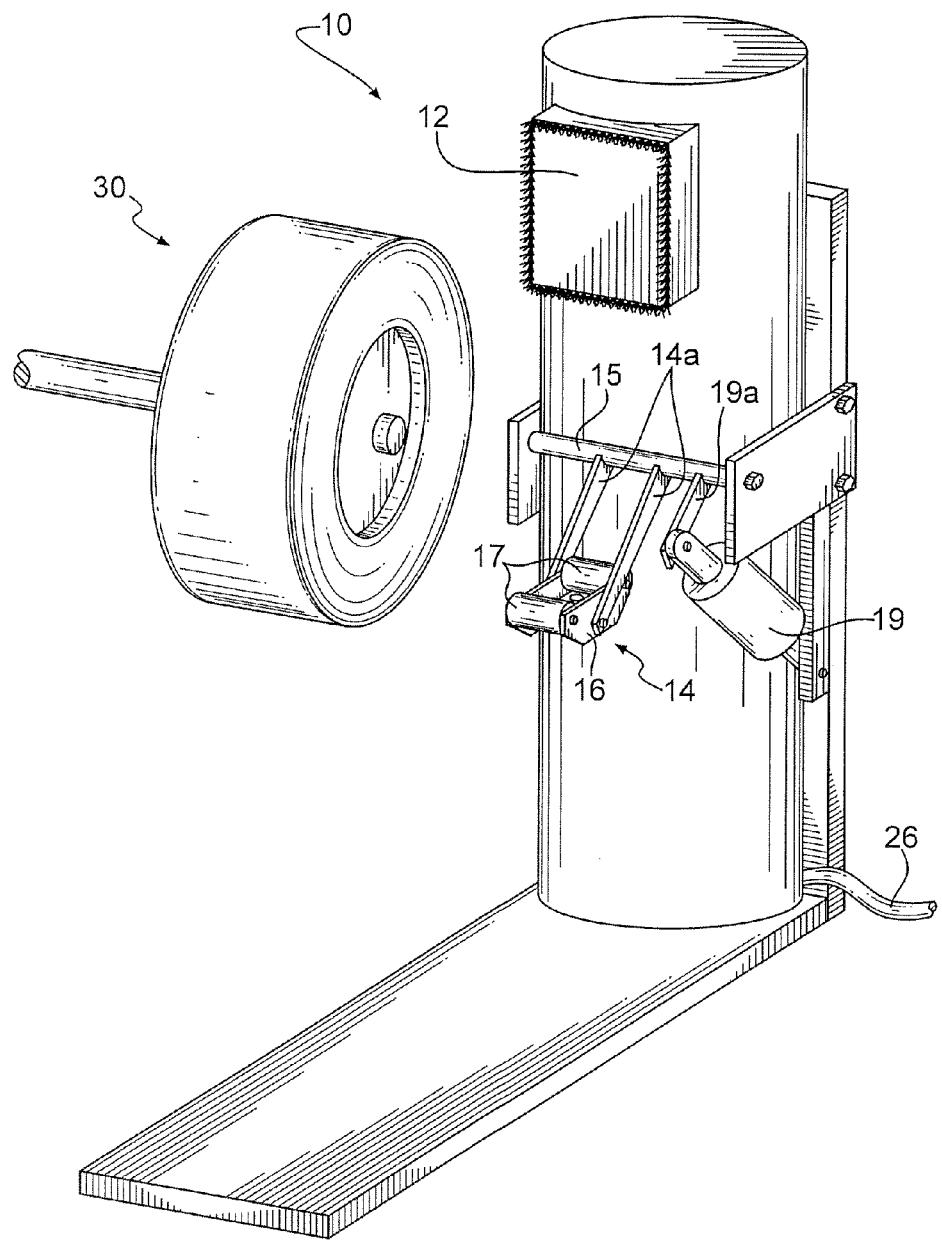
FIG. 1 is a perspective view of a tire buffing machine according to an embodiment of the invention.
Figure 2:
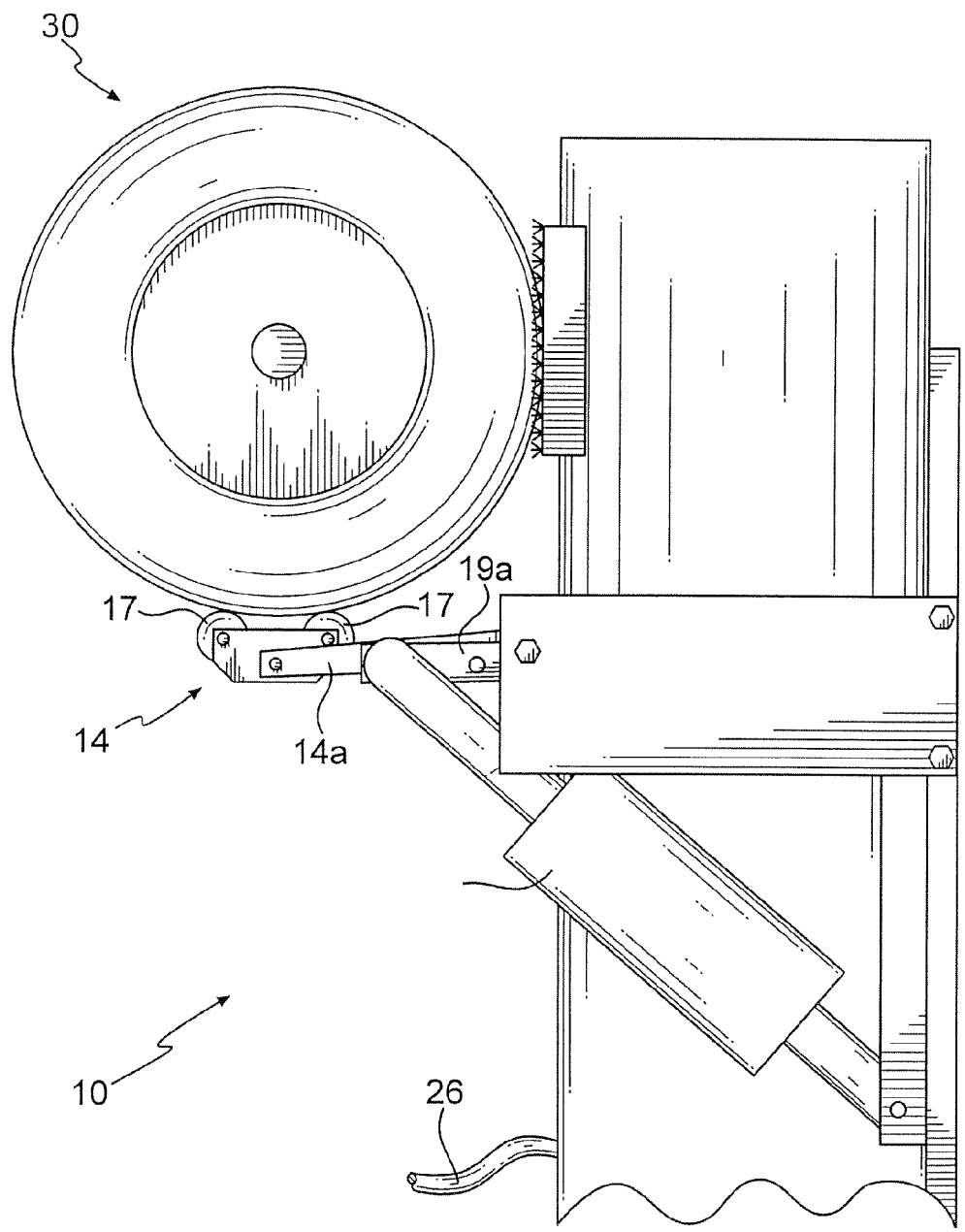
FIG. 2 is a side view of a portion of the machine shown in FIG. 1.
Figure 3:
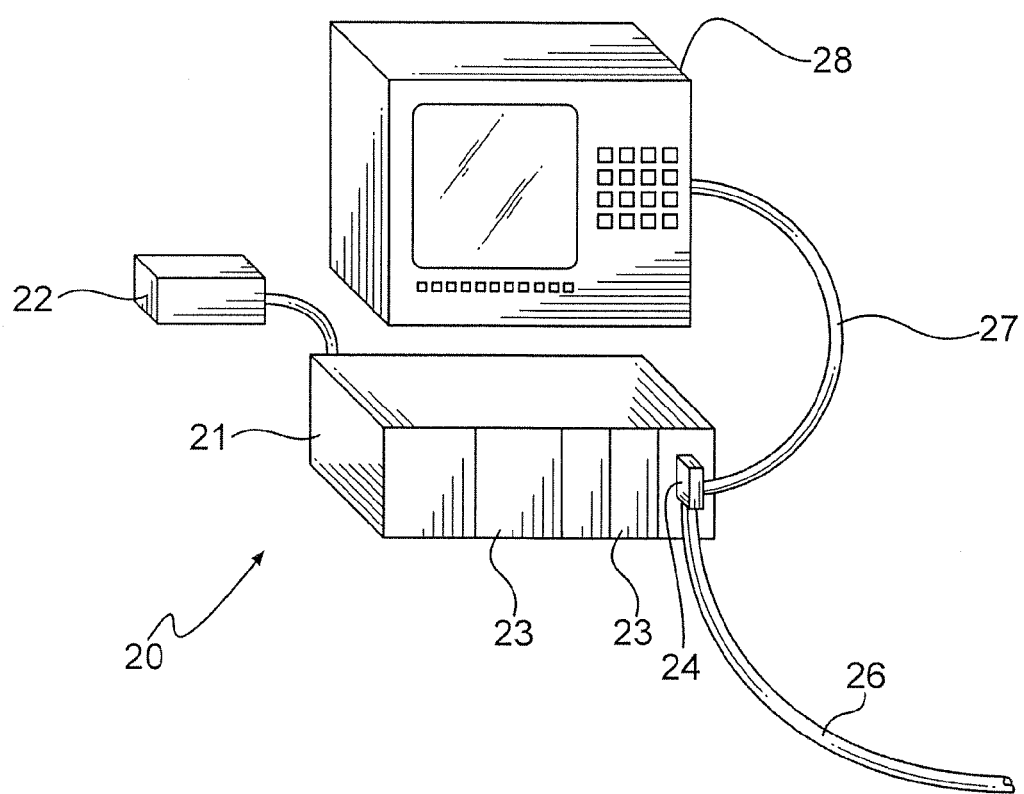
FIG. 3 is a perspective view of a controller of the machine of FIG. 1.
Figure 4:
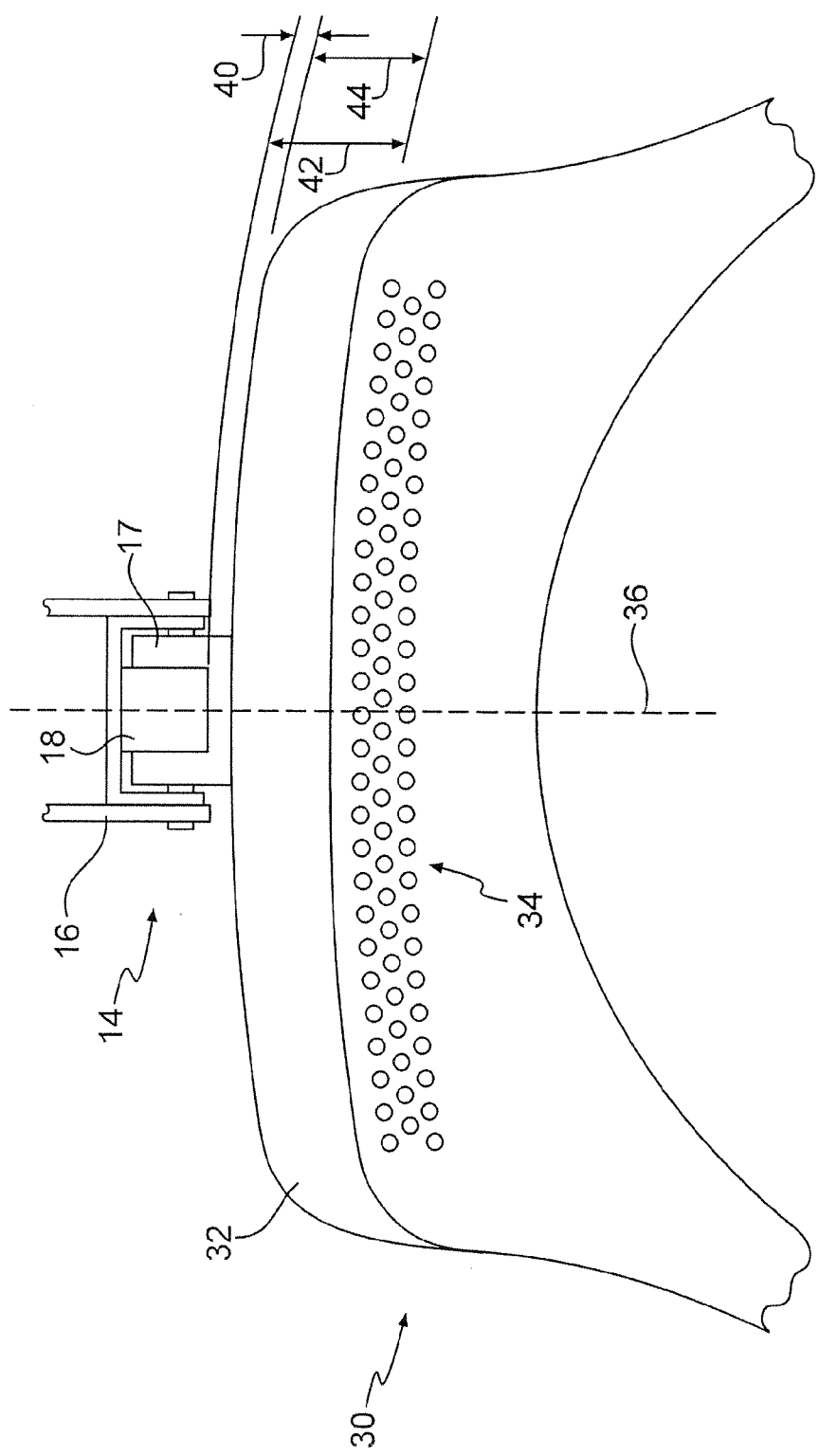
FIG. 4 is a cross-sectional view of the tire and sensor portion of FIG. 1.

Particular embodiments of the present invention provide methods, computer programs and apparatus for automatically correcting an asymmetrical buff on a tire that is being prepared for a retreading operation. Such preparation includes buffing the tread from the crown of the tire.

A tire buffing machine typically buffs the tread from a tire at a predetermined buffing radius that typically corresponds to the upper contour of the belt package. The buffing radius is defined by the length of the buffing radius and the location of the origin of the buffing radius. The belt package is below the tread and undertread of the tire and the casing is buffed to leave only a predetermined thin layer of material remaining over the top belt. The buffing radius is selected for the tire being buffed so that, for example, a wide tire is buffed at a much larger buff radius than a narrow tire is buffed. The buffing radius typically has its origin located on the tire centerline, the line that passes perpendicularly through the lateral center point of the tire crown.

The buffing machine usually makes several side-to-side passes across the tire crown to remove the tread, each tread removal pass removing additional tread from the tire crown. These tread removal passes are made until the desired amount of rubber has been buffed from the crown and the face of the casing that receives the replacement tire tread is buffed to the predetermined crown radius.

After a pass by the buffing head, if the rubber remaining above the tire belts is about the same, within a given tolerance, then the resulting buff is a normal buff. Otherwise, the resulting buff may be considered to be an asymmetric buff or a symmetrically deviated buff. An asymmetrical buff may be defined as a buff that removes more rubber from the crown on one side of the tire centerline than from the other side of the tire centerline. An asymmetrical buff differs from a symmetrically deviated buff wherein the symmetrically deviated buff is symmetrical about the centerline of the tire but the amount of rubber remaining across the width of the crown is not the same, e.g., more rubber remains towards the shoulders of the tire than at the centerline of the tire.

A symmetrically deviated buff may occur, for example, as a result of buffing the tire with a buffing radius that is too long or too short. If the tire is buffed at a buffing radius that is too long, then the shoulders on both sides of the tire will have a greater amount of rubber remaining than the center portion of the crown. If the tire is buffed at a buffing radius that is too short, then the shoulders on both sides of the tire will have a lesser amount of rubber remaining than the center portion of the crown.

Asymmetrical buffing may occur, for example, as a result of the deflection of mechanical components of the buffing machine during the buffing process, including the shaft that supports the tire and rotates the tire during the buffing process. As the buffing head comes in and pushes against the tire during the buffing process, the shaft may move very slightly away from the buffing head, especially at the unsupported outboard end of the shaft. Such movement may result in an asymmetrical buff since less rubber will be removed from the outboard side of the tire than from the inboard side of the tire.

The apparatus and methods useful for buffing the tread from a tire along a predetermined buffing radius are well known to one having ordinary skill in the art. For example, some buffing machines move the buffing head across a stationary but rotating tire to buff the tire along the arc described by the buffing radius. Other buffing machines move the tire across the stationary buffing head to buff the tire along the arc described by the buffing radius. Some buffing machines control the contact between the tread and the buffing head by moving, for example, the buffing head along an X-Y coordinate system to buff the tire along the arc described by the buffing radius. Others, for example, control the contact between the buffing head and tire by pivoting the buffing head about a mechanical pivot point to buff the tire along the arc described by the buffing radius. It should be noted that the origin of the buffing radius is not a mechanical point or a mechanical pivot point, but is the origin of the buffing radius that describes the arc along which the controller of the buffing machine causes contact to be made between the buffing head and the tire tread.

As noted above, an asymmetrical buff of the tire occurs when one side of the tire, e.g., the outboard side of the tire, has less rubber remaining than the other side of the tire, e.g., the inboard side of the tire. Embodiments of the present invention automatically correct the asymmetrical buffing by shifting the position of the origin of the buff radius off of the centerline of the tire, typically in the direction of that side of the tire that requires more rubber to be removed. Such a shift will remove more rubber on one side of the tire and less rubber on the other side of the tire, thereby correcting the asymmetrical buff.

As noted above, a symmetrically deviated tire occurs when a greater or lesser amount of rubber remains equally on both sides of the tire than the amount that remains in the middle of the tire. Embodiments of the present invention automatically correct the symmetrically deviated buffing by shifting the position of the origin of the buffing radius to a new location along the centerline of the tire, either closer to the tire to make the buffing radius shorter or away from the tire to make the buffing radius longer.

Particular embodiments of the present invention include measuring the amount of rubber left above the belts in the crown of the tire, typically during or after the buffing head has made a pass on the tire. Such measurements are made at discrete transverse locations across a portion of the tread. If such measurements reveal that the buff is symmetrically deviated, i.e., that there is a greater or lesser amount of rubber remaining equally on both sides of the tire than the amount that remains in the middle of the tire or reveal that the buff is asymmetrical, i.e., that there is thicker rubber on one side of the centerline of the tire than on the other side of the centerline of the tire, then the origin of the buff radius is moved to one or more proposed positions by iteration and the effect of these moves is calculated and compared to the measurements of the thickness taken after the buffing pass. A statistical analysis, such as a least squares analysis, may be made to select the best of the iterated proposed origin positions and a second buffing pass may then be made with the buff radius originating at the new selected origin position.

Particular embodiments of the present invention include methods for determining a buffing radius for buffing tread from the crown of a tire and/or methods for correcting an asymmetrical buff. Such methods may include the step of determining a position for an origin of the buffing radius, the buffing radius describing the arc along which tread is buffed from the crown of the tire. The buffing radius is defined by both a length and an origin position.

Particular embodiments of such methods may include the step of receiving a signal from a sensor, the sensor scanning a transverse path across at least a portion of the crown of the tire, the signal being received from each of a plurality of transverse locations across the at least a portion of the tire crown, the signal being generated by the sensor as a function of a distance between the tire crown and a belt in the tire. It is recognized that the tire is spinning during the buffing process and the sensor generates the signal as the sensor passes transversely across the spinning tire. Therefore, the transverse positions may be located at any point on the circumference of the tire or alternatively, may be taken transversely at the same circumferential position, i.e., at each complete rotation of the tire past the sensor or at each fractional rotation of the tire past the sensor, e.g., at each half rotation or each quarter rotation and so forth.

The number of transverse locations from which the signals are received may vary widely as circumstances dictate. However, typically between 2 and 10 locations on each side of the tire centerline are considered adequate for applications of particular embodiments. The signal from the sensor is generated as a function of a distance between sensor and the belts of the tire. If the distance between the crown surface and the sensor are known, and such distance can be measured, then the distance between the crown surface and the belts can be determined by subtracting the distance from the sensor to the surface from the distance from the sensor to the belts. Thus, the signal from the sensor is also generated as a function of a distance between the crown surface and the belts of the tire. Therefore, particular embodiments of the invention may further include the step of interpreting the signal as measured distances between the crown surface and the belts in the tire at each of the plurality of transverse locations.

With the goal of determining a new position of the buffing radius origin that will be used by the buffing machine to buff the tire on the next buffing pass, the methods may further include the step of selecting one or more proposed origin positions for a new buffing radius. To correct a symmetrically deviated buff, each of the proposed origin positions is on the centerline of the tire. To correct an asymmetrical buff, each of the proposed origin positions is not on the tire centerline of the tire.

Using the one or more proposed origin positions, the methods of particular embodiments of the present invention may further include the step of calculating a projected distance between the crown surface and the belt at each of the plurality of transverse locations across the crown, wherein each projected distance is based upon the arc described by the buffing radius having the one or more proposed origin positions.

The methods may further include the steps of choosing a new position for the new buffing radius from the one or more proposed origin positions and buffing the tread from the tire crown along the arc described by the new buff radius. Particular embodiments may include, as part of the step of choosing the new position for the new buffing radius, the step of choosing the new origin position through statistical analysis of calculated differences between the measured distances and a target distance and calculated differences between the projected distances and the target distance, the differences being calculated for each of the plurality of transverse locations.

The measurements of the rubber thickness remaining after a buffing pass, which were determined from the signals received from the sensor, may be used in particular embodiments as a step of determining if the buff of the tread from the crown of the tire at the buffed buffing radius was an asymmetrical buff, a symmetrically deviated buff, a normal buff or a combination thereof. If the measured thicknesses at the plurality of transverse locations are the same, or within accepted tolerance, then the buff was normal and no correction to the position of the origin of the buffing radius is necessary. If the measured thicknesses show that the thicknesses are greater on one side of the tire centerline than on the other side, then the buff is an asymmetric buff. If the measured thicknesses show that the thicknesses are symmetric about the centerline but that there was a different amount of rubber remaining near the centerline than at the extreme locations away from the centerline, then the buff was symmetrically deviated. Such determination may, of course, be determined by subtracting each of the thickness measurements taken from the plurality of transverse locations across the crown from a target value, which may be, for example, the measurement taken at the centerline or other target as defined for a particular application.

If it is recognized that the buff was asymmetrical, symmetrically deviated or combinations thereof, then particular embodiments of the present invention may include the step of determining to move the position of the origin of the buff radius along the centerline of the tire if the buff was symmetrically deviated, to move the position of the origin normal to the centerline if the buff was asymmetrical, and/or to move the origin to a position that is in a direction normal to the centerline and then in a direction along a line that is parallel to the centerline if the buff was both asymmetrical and symmetrically deviated.

If the buff was normal, then embodiments of the present invention may include the step of selecting the new origin position to be identical to the buffed buffing radius origin position if the buff at the buffed radius was a normal buff. An additional step includes reducing the buffed buffing radius length to the new buffing radius length. Such a new radius length would be shorter so as to remove more rubber during the next buffing pass. Alternatively, the origin position may move along the centerline away from the tire, keeping the length the same having the same effect of shortening the length of the buffing radius but making an arc that is concentric to the arc of the previous normal buff.

Particular embodiments of the present invention may further include the steps of changing the length of the buff radius having the new position of the buffing radius origin and buffing the tread from the tire crown along the arc described by the buff radius having the new buffing radius origin at the new position and the changed buffing radius length. Particular embodiments of the present invention may include the step of shortening a length of the new buff radius, wherein the arc is closer to the belt of the tire at the shorter length.

Particular embodiments of the present invention may further include the step of progressing through a series of iterations to select the proposed origin positions for the new buff radius. As disclosed above, the iterations of the proposed origin position may be directed as determined as result of the determination as to whether the buffing at the buffed radius was normal, asymmetrical, symmetrically deviated or combinations thereof.

The methods described herein may be employed by a tire buffing machine and embodied in computer software. The methods and the manner in which they are employed or practiced in exemplary embodiments are discussed in further detail below.

FIGS. 1-4 generally disclose a tire buffing machine 10 that is adapted to remove tread from a tire according to the methods, computer programs and apparatus of particular embodiments of the present invention. More specifically, the buffing machine 10 is adapted to buff the tread from a tire at a selected buff radius, the buff radius being defined by its length and the position of its origin. The buffing machine 10 generally includes a tread removal tool or buffing head 12, a sensor assembly 14, a sensor output 26, a programmable logic controller 20 or other device having a processor that can execute programmed instructions, such as, for example, a personal computer or main frame computer, and a user interface 28. The buffing head 12 removes tread material 32 from the crown of the tire 30, and may comprise any device capable of removing tread from a tire, including, without limitation, abrading devices, such as rasps, grinding wheels, and wire brushes, and cylindrical cutters or "peelers."

Optionally, as known in the art, the buffing machine 10 may also include one or more buffing heads 12. A buffing machine having a single buffing head 12 is commonly referred to as a single head buffing machine, while a buffing machine having two buffing heads 12 is referred to as a dual head buffing machine. It is contemplated that the buffing head 12 may be used to remove any material other than tread 32, such as for example, undertread, which is generally elastomer that is located between the belts 34 and the tread 32. However, it is noted that the present invention may be implemented on any type of buffing machine that removes tread 32 from a tire 30 along an arc described by a buffing radius.

The sensor assembly 14 is generally used to measure the amount of material above the tire belt 34. Such material generally includes the tire tread 32, but may include other material, such as for example undertread. In the embodiment shown, the sensor assembly includes a frame 16, a pair of rollers 17, the sensor 18, and arms 14a for connecting the frame 16 to the shaft 15. In the embodiment shown, the shaft 15 rotates so that the sensor assembly 14 may engage and disengage the tire 30. A cylinder 19 with rotation arms 19a may be used to rotate the shaft 15; however, it is also contemplated that any other rotation means may be used to rotate the shaft 15, including without limitation a manual lever or a motor. It is also contemplated that in alternate embodiments, the rotation means 19 may also rotate the arms 14a about a static shaft 15 or even that the arms 14a be replaced with only one arm.

In particular embodiments, as shown in FIG. 1, the sensor 18 is operably mounted in a fixed relation to the buffing head 12 and scans or measures the amount of material remaining above the belts 34 after the buffing head 12 has buffed the tread (i.e., while the tire is spinning and the buffing head 12 is buffing). Being operably mounted in a fixed relation to the buffing head describes that the sensor, when operating, is located at a constant relationship to the buffing head. When the contact between the buffing head and tire crown moves along the arc described by the buffing radius, the sensor moves along in a fixed position to the buffing head. On a buffing machine having a buffing head that pivots about a mechanical pivot point, then the sensor may be mounted on the pivoting member so that the sensor mounting moves with the buffing head as the buffing head pivots. On a buffing machine having a buffing head mounted on a pedestal that moves along an X-Y coordinate system, then the sensor may be mounted on the pedestal so that the sensor mounting moves with the buffing head as the buffing head moves along the X-Y coordinate system.

Because the buffing machine 10 is controlled by the controller 20 to buff the tire along an arc described by the buff radius, one having ordinary skill in the art will readily realize that the location of the sensor 18 can easily be determined because of the sensor 18 is operably mounted in a fixed relation to the buffing head 12. Since the controller 20 can determine exactly where the buffing head 12 is in relation to the centerline of the tire 36 as it controls the area of contact between the buffing head 12 and the tire 30, the controller 20 can determine the location of the sensor 18 that is in an operably fixed relation to the buffing head 12 by the use of simple trigonometric and/or math functions. In this manner, the controller 20 can determine each of the plurality of transverse locations from which it receives the signals from the sensor 18.

Of course in other embodiments, it is contemplated that the sensor assembly 14 and/or the sensor 18 may be independent of the buffing head 12 and/or may be located on a device or machine independent of, or other than, the buff machine 10. In those embodiments, a servo device, for example, can move the sensor across the tire and provide input into the controller 20 as to the location of the sensor relative to the centerline 36 of the tire. Such devices are well known and are fully described in U.S. Pat. No. 6,386,024.

Alternatively, in other embodiments, the sensor may be a series of individual sensing devices mounted in fixed relation to the rotating tire. For example, a first sensing device may be mounted above the crown at the centerline 36, a second and third sensing devices mounted at a fixed distance on either side of the first sensing device and so forth. This series of sensing devices is an exemplary embodiment of a sensor (collection of sensing devices) providing a signal from each of a plurality of transverse locations (the location of each of the sensing devices) across a portion of the tire crown, the sensor scanning a transverse path across the crown of the tire.

The sensor 18 is generally located radially above or outward from the tread 32 and may or may not be located at an offset distance 40 above the tire tread 32. The sensor 18 may comprise an ultrasonic, magnetic or inductive proximity sensor for measuring the distance between sensor 18 and belt 34. However, it is contemplated that any other sensor type may be used, including those capable of locating non-ferrous cord material. For a single head buffing machine, a single sensor may be associated with the single buffing head 12. A dual head buffing machine may include two sensors, with each sensor being associated with one of the buffing head 12.

For a single head buffing machine 10, the buffing head 12 and the sensor 18 may begin the buffing and scanning process at the tire centerline 36 and continue to one of the tire shoulders (i.e., one side of the tire tread) for a first pass. After making the initial pass, the buffing head 12 and the sensor 18 may return to the tire centerline 36 to begin a subsequent pass for buffing and scanning the other half of the tire tread 32. Since the buffing of the tire tread 32 is typically symmetrical about the tire centerline 36, the method that includes the step of determining a new buff radius origin position may perform that step for each buffing pass. It is also contemplated that the buffing head 12 and the sensor 18 may begin the initial pass at a shoulder or side of the tire, and then buff and scan across the tire tread to the other shoulder or side, thereby buffing and scanning the tire tread in a single pass. It is contemplated that particular embodiments of methods that include determining a new buff radius origin position may be performed during or after each pass.

The sensor 18 generates a signal response as a function of the distance 42 between the sensor 18 and the tire belt 34. The signal response may be represented by a value, which may represent current, voltage, resistance, or any other characteristic of the signal response. Ultimately, the signal is sent to the programmable logic controller 20 by way of input/output (I/O) cable 26 for evaluation and processing.

The controller 20 interprets the received signal as a distance between the belt 32 and the sensor 18. If the sensor is in substantial contact with the tread outer surface, the signal generally represents the thickness of the material above belt 34. If the sensor is an offset distance from the tread 32, the material above belt 34 equals the distance measured by the sensor minus the offset distance 40. Without limitation, the signal may also be sent by wireless communication to controller 20, such as without limitation by infrared signal or radio frequency, by one or more cables, including without limitation fiber optics, or any other method or means known to those having ordinary skill in the art.

Programmable logic controller 20 generally receives signal responses from sensor 18 to monitor and help control the amount of tread 32 being removed from tire 30. In a known way, the controller 20 manipulates the buffing head 12 and/or the tire 30 so that the buffing head 12 contracts and buffs the tire 30 along the arc described by the buffing radius. In particular embodiments of the present invention, the controller 20 further interprets the signals received from the sensor 18 as the measured distance between the tread surface 32 and the belts 34.

Figure 5:
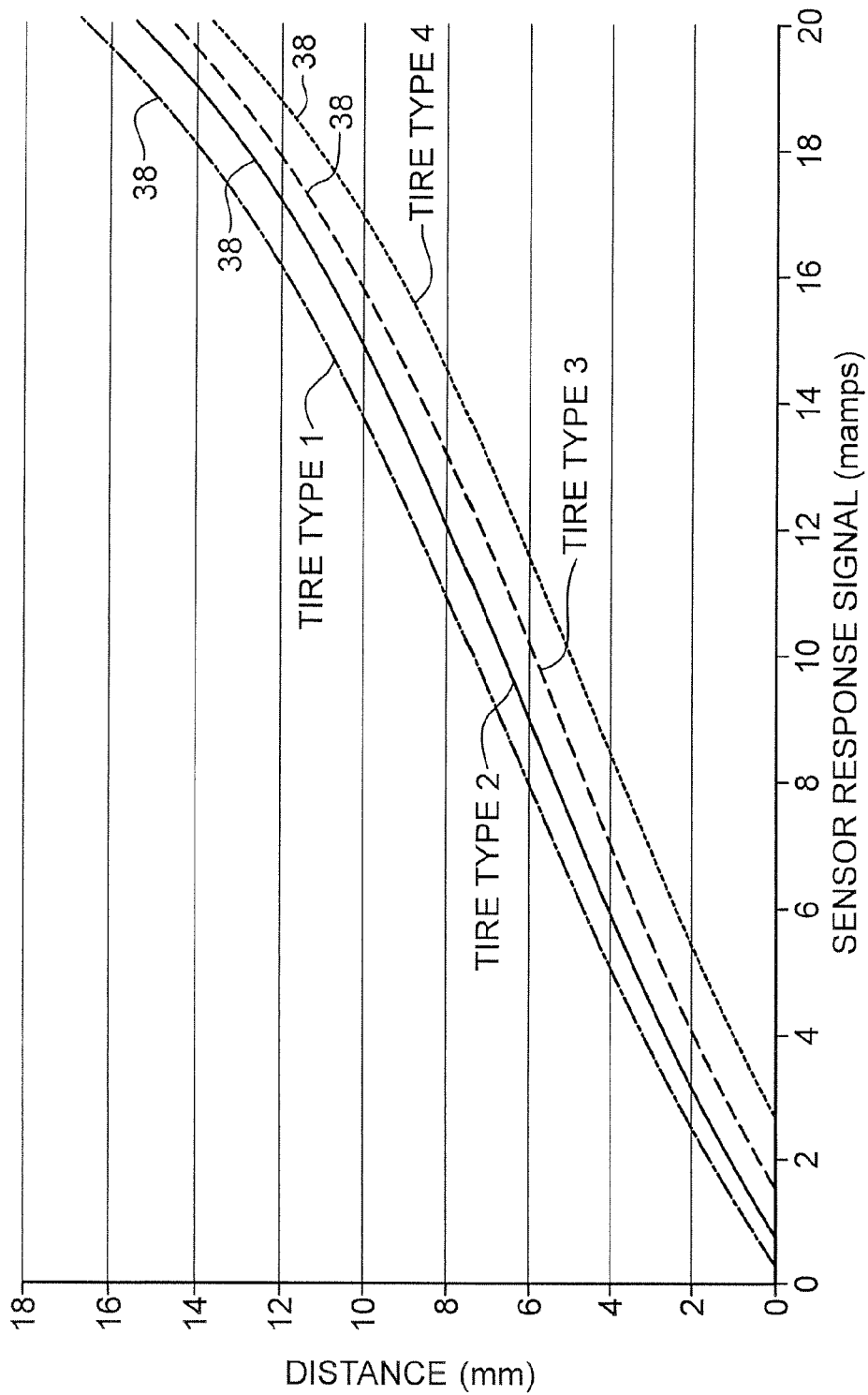
FIG. 5 is a graph showing a plurality of signal response curves according to an embodiment of the invention.

In particular embodiments, the controller 20 may utilize signal-distance functions or tables (i.e., signal response curves 38 as shown in FIG. 5 to convert a signal response into a corresponding distance, such as the signal response curves disclosed in PCT Application No. PCT/US07/65522, filed Mar. 29, 2007 and hereby fully incorporated by reference. Controller 20 includes a logic processor 21, which may be a microprocessor, a memory storage device 22, such as RAM (random access memory), ROM (read-only memory), PROM (programmable read-only memory) and at least one input/output (I/O) cable 26 for communicating with the buffing machine 10. Further, the controller 20 may include an I/O slot 23 for housing an I/O card having I/O cable connector 27. An operator may utilize a user-interface 28 to monitor the sensor measurements and to program, or otherwise control or instruct, the operation of controller 20 and the buffing machine 10, which includes performing each step and method associated with determining a new or corrected buff radius origin position as detailed below. The user-interface 28 and the controller 20 may communicate by way of I/O cable 27. It is also contemplated that wireless communications may exist between the controller 20, the user-interface 28, and the buffing machine 10.

Generally, the controller 20 may be programmed by any known graphical or text language. Programmed instructions, data, input, and output may be stored in a memory storage device 22, which is accessible to the processor 21. Particularly, programmed instructions related to the methods disclosed herein may be stored in the memory storage device and executed by the processor 21. The memory device 22 may comprise any commercially known storage device, such as hard disk drives, optical storage devices, flash memory, and the like. The processor 21 executes programmed instructions and may perform the distance calculations and measurements, and execute the instructions pertaining to the methods disclosed herein as well as other operations discussed herein. The memory storage device 22 also stores inputs, outputs, and other information, such as, for example, functions and tables representing signal response curves 38 for use by processor 19 in performing its operations. In addition to performing distance conversions and measurements, the controller 20 may also be programmed to generate signal response curves 38, which may also be expressed as tables 39, based upon received input.

With reference to FIGS. 5 and 5A, signal response curves 38 may be used by the controller 20 to convert signal responses received from the sensor 18 into distances. The signal response curves 38 are generally functions of the distance 42 between the sensor 18 and belt 34, and relate a signal response to a distance. The signal response curves 38 may be stored in a memory storage device 22 as a function or as a table. The processor 21 utilizes a desired signal response curve to determine the distance corresponding to the signal received.

More specifically, in an exemplary embodiment, the distance is determined from a function that represents signal response curve 38, which may be linear or non-linear. In another embodiment, the distance is determined from a table 39 that represents signal response curve 38, by locating from the table the two signal responses closest in value to the signal response received and then obtaining a linear relationship between the two signal responses and their corresponding distances. From the linear relationship, a distance is determined for the signal response received. The linear relationship may comprise a linear function or may be based upon a percentage or ratio relating the signal received to range between the two points selected from the table. If, by chance, the signal response received is substantially equivalent to a signal response within a table 39, the corresponding distance may also represent the distance of the received signal response.

Because signal responses may vary from tire to tire, a plurality of signal response curves 38 may be provided in exemplary embodiments, where each response curve 38 represents a tire or a plurality of tires sharing a common tire characteristic, such as, for example, a tire size, shape, construction, manufacturer or brand, or a tread profile. Consequently, to more accurately control tread measurement and removal, the processor 21 selects a signal response curve 38 based upon a known tire characteristic, or based upon certain information or instructions received from an operator. Signal response curves 38, as functions or as tables 39, are generally stored in a memory storage device 22 and used by the processor 21 to determine the distances according to programmed instructions reflecting the above stated methods.

Figure 6:
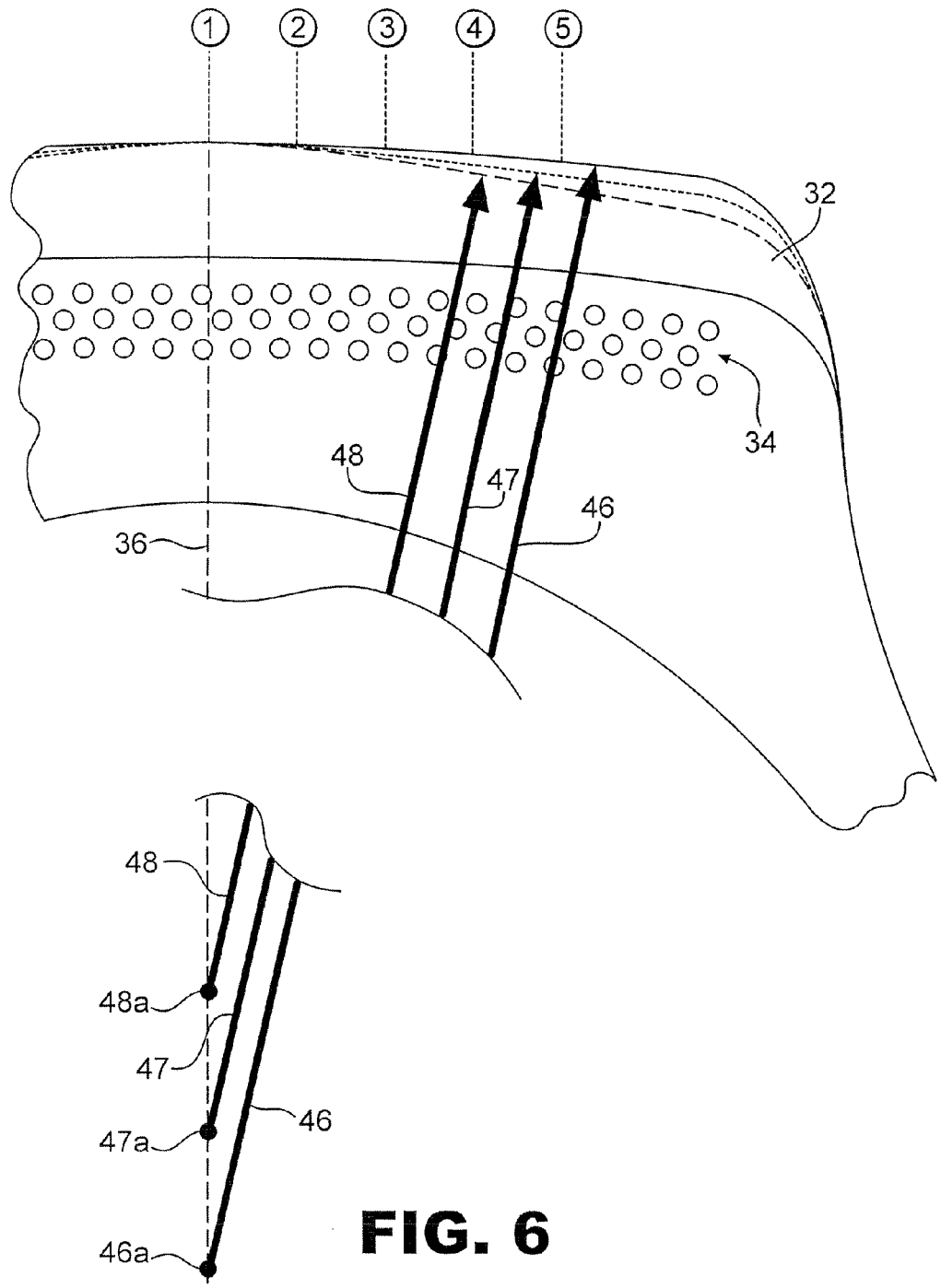
FIG. 6 is a cross-sectional view of a portion of the tire of FIG. 4 showing buff radii having different lengths and origin positions.
Figure 9:
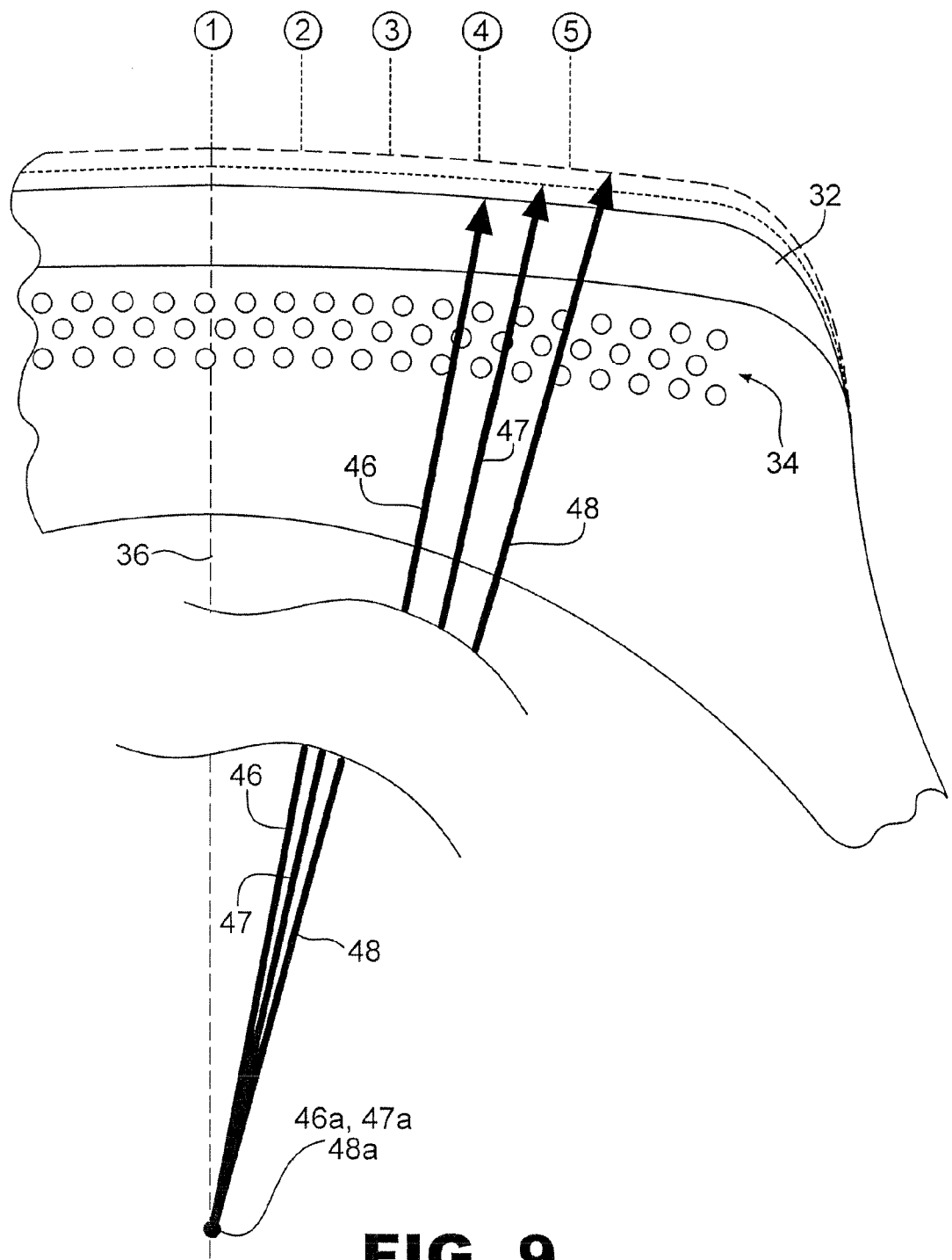
FIG. 9 is a cross-sectional view of a portion of the tire of FIG. 4 showing buff radii having different lengths and originating from the same origin position.

Referring generally to FIGS. 6-16, the tire buffing machine 10 may buff the tread 32 of the tire 30 at one or more buff radii 46-48 (FIG. 6). Each buff radius includes a length and an origin 46a-48a, which is located along centerline 36. When the tire tread is buffed at a particular buff radius, the tread outer surface forms a curve or arc that is described by the buff radius 48. In the figures, buff radius 48 represents an initial (or previous) buff radius having an origin 48a. The other buff radii 46, 47 shown represent trial or proposed buff radii each having respective origins 46a, 47a, which can be examined to determine whether one of these proposed radii will provide a desired amount of material above the belt 34 after buffing. As disclosed herein, particular embodiments of the present invention use these proposed buff radii to calculate a projected amount of tread that would have been removed had the proposed buff radii been used.

The sensor 18 may be used to scan the tread 32 at a plurality of transverse locations across at least a portion of the tire crown, and measure at each location the distance between the sensor 18 and the belt 34, before or after a first buffing pass by the buffing head 12. When preparing a tire for retreading, it is desirable to have a substantially consistent thickness of tread across the belt width and/or a minimal amount of material remaining above the belt 34.

In one exemplary embodiment, as shown in FIG. 6, a tire 30 may initially be buffed at an initial buff radius 48 having an origin 48a positioned as shown on the centerline 36. Concurrently with the initial buff, the sensor 18 may scan the tire tread 32 of the crown and generate response signals at a plurality of locations 1-5 across a portion of the tread 32. The plurality of locations 1-5 may or may not occur at constant increments across the tread. Further, the sensor 18 may scan the tread (i.e., generate signals) along a particular transverse path across the tread, in which a single signal is generated at multiple locations across the particular transverse path. In other words, the transverse path coincides with a cross-section of the tire normal to the centerline 36 of the tire. To achieve this, a trigger or timing function may be used to unsure that sensor 18 scans along the path while the tire is rotating. A trigger may comprise any known device or method, including without limitation any encoder or proximity sensor known to one having ordinary skill in the art. A proximity sensor may utilize an object, such as a metal object (a block, screw, or the like) that is attached to the tire or rim to initiate a scan that is to be taken along a specific transverse path.

As an alternative to scanning along a transverse path or scanning arbitrarily around the tread circumference, the sensor 18 may generate multiple signals around the tire at each transverse location or between transverse locations, for the purpose of obtaining an average measurement at each such location or range along the tire tread. Because the tire belt 34 may vary at its outer edges, it may be desirous to only scan only a portion of the tread, for example, only the inner 80% of the tread width, for the purpose of determining the new buff radius and/or new position for the origin of the buff radius, which then may be used to buff the tire.

After scanning the crown of the tire 30, the controller 20 may interpret the signals it receives from the sensor 18 into the measured distances 42 between the sensor 18 (or tread surface) and the belts 34. For subsequent analysis and comparison, the measured distances 42 may or may not be converted to represent the thickness of the material 44 remaining above the belt 34, which is achieved by subtracting from the measured distances 42 the offset distance between the sensor 18 and the crown tread 36, if any offset exists.

Subsequent to obtaining the measured distances, the measured distances may be compared to a target distance, which is typically the thickness of the rubber at the location 1 of the centerline 36 of the tire, though the target may be selected by any criteria relevant to a given application. The target distance generally reflects the result that was targeted with the initial buff radius 48. It is contemplated, however, that the target distance may reflect the distance desired from a subsequent buff pass.

Due, for example, to the inherent inconsistency of elastomeric material, machine wear, variation in machine components and the weight of the tire, any buff may not achieve the desired results. Consequently, a tire tread may be buffed at a buff radius having its origin at a position that ultimately provides a buffed surface contour that varies from that which was desired. This deviation may be symmetric or asymmetric about tire centerline 36. If the deviation is symmetric, that is, if the buffed contour is substantially centered along the tread width, correction of the symmetrically deviated buff may be achieved by moving the origin position of the buff radius along the tire centerline 36. If the deviation is asymmetric about centerline 36, correction of the asymmetrical deviation may be achieved by moving the origin of the buff radius transversely in relation to the tire or the tire centerline 36. It contemplated that both corrections may occur simultaneously, that is to say that the position of the origin of the buff radius may be moved (1) vertically in relation to the tire crown (i.e., closer or further from the tire tread 32 along the centerline 36), and/or (2) horizontally or transversely in relation to the tire crown (i.e., tire side-to-side normal to the centerline 36).

Such adjustment to the location of the origin of the buff radius will result in a flatter or steeper buffing arc (if the origin is moved along the centerline at a constant radius length) or in an off-centered (shifted) arc (if the origin is moved normal to the centerline at a constant radius length). Then, of course, the radius length may be shortened and buffed with the new origin position if the desire is to remove additional rubber across the crown of the tire at a steeper, flatter and/or off-centered arc as compared to the first or previous buff.

Particular embodiments of the present invention may include the step of determining whether the buff radius that was used on a buffing pass of the tire is correct or if the buffing operation resulted in an asymmetrical buff, a symmetrically deviated buff or combinations thereof. This determination may be made, for example, by comparing the differences between the measurements determined from the sensor readings received from each of the plurality of transverse locations across the crown of the tire. The differences may be between the measurements themselves or between the measurements and a target. The target may be the measurement taken at or near the centerline or any target value suitable for a particular application.

As shown in FIGS. 6-14, particular embodiments of the present invention include calculating a difference between the measured distances and a target distance and between the projected distances and the target distance. The measured distance is the distance measured by the sensor at each of the plurality of transverse locations across the tire crown. Such measured distances may result, for example, from a buffing operation performed with a first buff radius 48 having a first origin position 48a located on the tire centerline 36. The projected distance is the distance that would have resulted had the buffing operation been performed with a proposed buffing radius 46, 47 having a proposed buffing origin location 46a, 47a. Such proposed distances may result, for example from a first proposed origin position 46a for the first proposed buff radius 46.

Particular embodiments of the present invention provide progressing through a series of iterations of selecting a plurality of proposed origin positions 46a, 47a for proposed buff radii 46, 47 and calculating the projected distance between the crown surface and the belt at each of the plurality of transverse locations across the crown, wherein each projected distance is based upon the arc described by a buffing radius having the one or more proposed origin positions. The result provides a plurality of projected distances compared to the measured difference from which a new buff radius position may be selected. Such selection may be made by use of a statistical analysis, such as a least squared method, as described below. Therefore, particular embodiments of the present invention further include the step of choosing the new origin position through statistical analysis of calculated differences between the measured distances and a target distance and calculated differences between the projected distances and the target distance, the differences being calculated for each of the plurality of transverse locations.

The calculation of the projected distance may be made by the same techniques and calculations that are used to control the buffing operation through an arc described by the buffing radius. Since the controller 20 knows where the buffing head 12 is located, for example in the X-Y field, at each of the plurality of transverse locations reported on by the sensor 18, then the controller 20 can calculate where the buffing head 12 would have been in the X-Y field at each of the plurality of locations for each of the proposed origin positions and/or buffing radius lengths (proposed buff). The difference between where the buffing head would have been at the proposed buff and where it was in the actual buffing pass provides the increased (positive difference) or decreased (negative difference) thickness of the material above the belts at the proposed buff. This difference, when added to the measured distance, can provide the projected distance at each of the transverse locations for the proposed buff.

FIG. 7 is a table that provides the measured thickness at each of the plurality of transverse locations across the outboard side of the tire as shown in FIG. 6. The table indicates that the thickness at the centerline (7 mm) is greater than the thickness away from the centerline (6.5 mm), thereby indicating that the buff was symmetrically deviated, since the other side of the tire had symmetrical results (not shown). The target for the buff was 7 mm and the differences between the measured thickness and target was calculated. The sum of the squares (1.08) of these differences was also calculated for the statistical method for choosing the next buffing radius.

FIG. 8 is a table that provides the projected distance or thickness at each of the plurality of transverse locations across the outboard side of the tire as shown in FIG. 6. The table indicates that for the given iterated buff radius, for example the first proposed buff radius 47 having an origin position 47a, the calculated projected distance was 7 mm at the centerline and almost 7 (6.8 mm) at the location 5 away from the centerline. The buff target remains the same and the differences and sum of the squares (0.06) were calculated. Since the sum of the squares is less, this proposed buff is an improvement over the initial buff.

The iterated selections of buff radius length and/or buff radius origin position may be made by any technique known to one having ordinary skill in the art. For example, the iterated buff radius may be selected arbitrarily or from a table of iterated buff radii, which may be stored in the memory of the controller 20, or any of its components. Alternatively, the iterations may be calculated, such as by controller 20 or any of its components, based upon the initial buff radius, the target distances, and/or the calculated differences. Particular embodiments of the present invention include selecting a plurality of buff radii and/or buff radii origin positions for evaluation as demonstrated above. The best of the proposed buffing origin positions/buffing radii can then be selected for subsequently buffing the tire in the next buffing pass. Such selection may be made, as shown above, by a least squares technique.

FIGS. 10 and 11 provide the same analysis for FIGS. 7 and 8. Such examples are provided for embodiments of methods that buff neither asymmetrically nor symmetrically deviated but buff normally. If it is determined that the initial buff radius provides fairly consistent differences across the measured crown, that is the tread thickness may be fairly uniform but the thicknesses may not be that which was intended or desired, the length of the buff radius may be adjusted to correct for the difference or offset without changing the origin location, or the origin location may be moved along centerline 36 with the radius length kept constant to correct for the difference.

Figure 12:
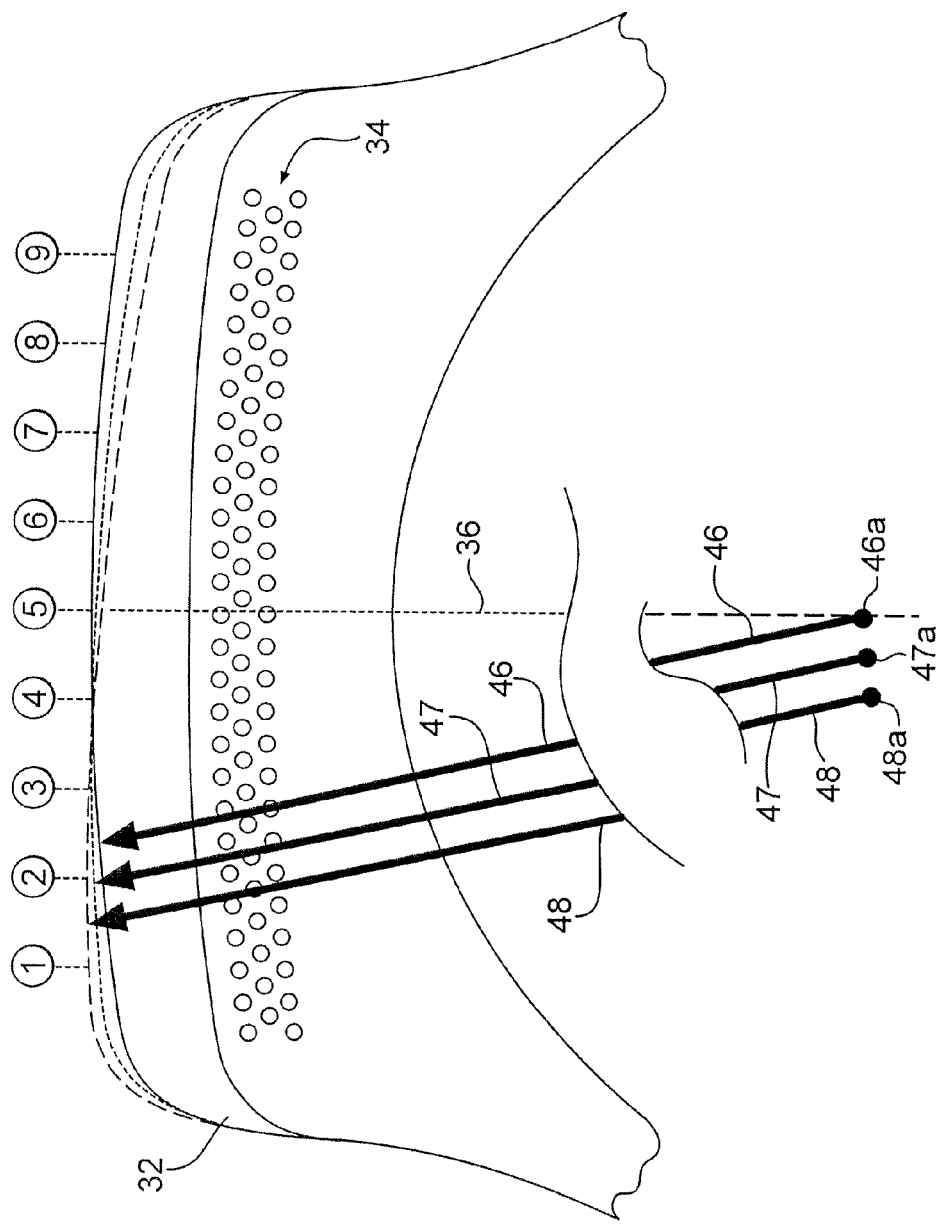
FIG. 12 is a cross-sectional view of a portion of the tire of FIG. 4 showing buff radii having different origins.

FIGS. 12-14 illustrate the correction of an asymmetrical buff. As shown in FIG. 13, the buff was asymmetrical because the after-buff measured distances at the locations 6-9 on the outboard side of tire are all less than 7 mm while those at locations 1-4 on the inboard side of the tire are all greater than 7. While the target value is shown as being 7 mm, the sum of the squared differences was 0.0671.

FIG. 14 is a table that provides the projected distance or thickness at each of the plurality of transverse locations across the tire as shown in FIG. 12. The table indicates that for the given iterated buff radius, for example the first proposed buff radius 47 having an origin position 47a which is located at a position normal to the centerline 36, the calculated projected distance was 7.01 mm at the centerline and almost 7 (6.92 mm) at the outboard location 9 and 7.11 at the inboard location 1. The buff target remains the same and the differences and sum of the squares (0.0324) are calculated. Since the sum of the squares is less, this proposed buff is an improvement over the initial buff.

A plurality of iterated origin points may be selected and evaluated as disclosed above before choosing a new origin point at which to subsequently buff the tire. When determining if the differences indicate whether the buff is asymmetric, a portion of the tread may be evaluated on both sides of centerline 36 or on a single side of centerline 36. Further, it is contemplated that a new buff radius and origin may be selected from the distances measured and projected, by determining therefrom the amount of material remaining above the belt across the tread of the tire. By plotting such a curve, the apex or peak of the curve (i.e., the point along the curve where the tangent is perpendicular to centerline 36) or the origin can be determined, and therefrom, the distance from which either located laterally from centerline 36 (the "offset distance") can be determined.

If the apex or origin is located at centerline 36, then the buff is generally symmetric. If the apex or origin is located a lateral distance from centerline 36, the origin point may be moved such distance closer to centerline 36 to provide a more symmetric subsequent buff. Once learning the offset distance, the origin can be moved such distance to the centerline 36 to re-center the buff radius on the tire tread. However, additional projected buff radius origins may be selected through iteration providing a better fit with a smaller sum of the squares.

Figure 15:
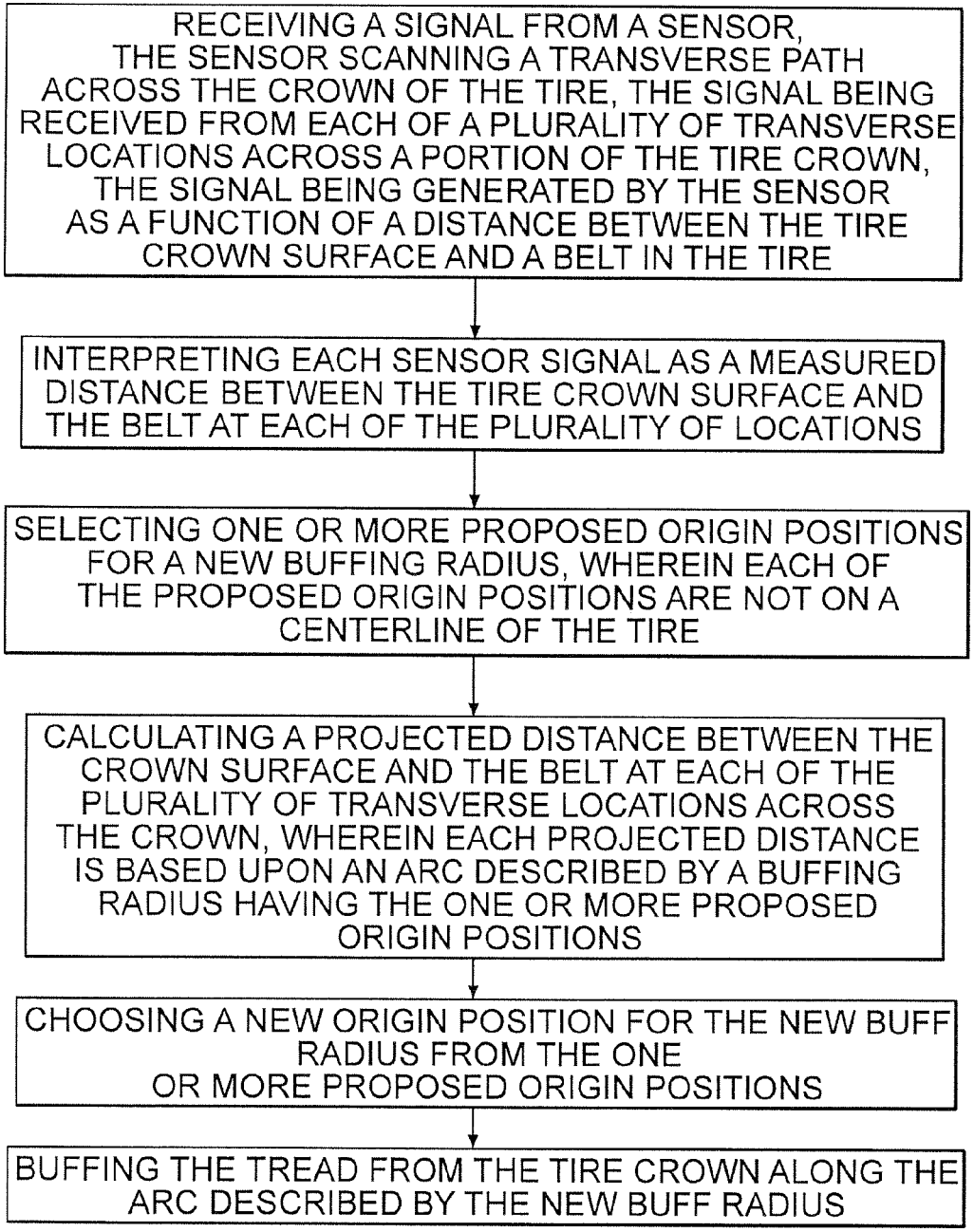
FIG. 15 is a flow chart of a method for correcting a buff of tread from a tire, in accordance with an embodiment of the present invention.

FIG. 15 is a flow chart of a method for correcting a buff of tread from a tire, in accordance with an embodiment of the present invention. States 102 through 110 describe the steps of a particular embodiment of the invention.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method for correcting a buff of tread from a crown of a tire, the buff being an asymmetrical buff, the method comprising:

receiving a signal from a sensor, the sensor scanning a transverse path across at least a portion of the crown of the tire, the signal being received from each of a plurality of transverse locations across the portion of the tire crown, the signal being generated by the sensor as a function of a distance between the tire crown surface and a belt in the tire;

interpreting the sensor signal as a measured distance between the tire crown surface and the belt at each of the plurality of locations;

selecting one or more proposed origin positions for a new buffing radius, wherein each of the proposed origin positions are not on a centerline of the tire;

calculating a projected distance between the crown surface and the belt at each of the plurality of transverse locations across the crown, wherein each projected distance is based upon an arc described by a buffing radius having the one or more proposed origin positions;

choosing a new origin position for the new buff radius from the one or more proposed origin positions; and buffing the tread from the tire crown along the arc described by the new buff radius.

2. The method of claim 1, further comprising:
determining if the buff of the tread from the crown of the tire at a buffed buffing radius was an asymmetrical buff, a symmetrically deviated buff or a combination thereof.

3. The method of claim 2, further comprising:
determining to move the position of the origin normal to the centerline if the buff was asymmetrical; and
determining to move the origin to a position that is in a direction normal to the centerline and then in a direction along a line that is parallel to the centerline if the buff was both asymmetrical and symmetrically deviated.

4. The method of claim 1, further comprising:
progressing through a series of iterations to select the proposed origin positions for the new buff radius.

5. The method of claim 1, wherein the step of choosing the new position further comprises:
choosing the new origin position through statistical analysis of calculated differences between the measured distances and a target distance and calculated differences between the projected distances and the target distance, the differences being calculated for each of the plurality of transverse locations.

6. The method of claim 5, wherein the statistical analysis is the least sum of the squares technique.

7. The method of claim 1, further comprising:
shortening a length of the new buff radius, wherein the arc is closer to the belt of the tire than an arc described by a buffed buffing radius.

8. A computer program product including instructions embodied on a computer readable storage medium, the computer program product acting to correct a buff of tread from a crown of a tire, the buff being an asymmetrical buff, the computer program comprising:
receiving instructions for receiving a signal from a sensor, the signal being received from each of a plurality of transverse locations across a portion of the tire crown, the signals being generated by the sensor as a function of a distance between the tire crown surface and a belt in the tire;
interpreting instructions for interpreting each sensor signal as a measured distance between the tire crown surface and the belt at each of the plurality of locations;
selecting instructions for selecting one or more proposed origin positions for a buffing radius, wherein the proposed origin positions are not on a centerline of the tire;
calculating instructions for calculating a projected distance between the crown surface and the belt at each of the plurality of transverse locations across the crown, wherein each projected distance is based upon an arc described by the buffing radius having the one or more proposed origin positions;
choosing instructions for choosing a new position of the buffing radius origin from the one or more proposed origin positions; and
buffing instructions for buffing the tread from the tire crown along the arc described by the buff radius having the buffing radius origin at the new position.

9. The computer program product of claim 8, further comprising:
determining instructions for determining if the buff of the tread from the crown of the tire at a buffed radius was an asymmetrical buff, a symmetrically deviated buff or a combination thereof.

10. The computer program product of claim 8, further comprising:
changing instructions for changing a length of the buff radius having the buffing radius origin at a new position; and
buffing instructions for buffing the tread from the tire crown along the arc described by the buff radius having the buffing radius origin at the new position and the changed length.

11. The computer program product of claim 9, further comprising:
selecting instructions for selecting the proposed origin position as being one that is not on a line that is both normal to a centerline and passing through the buffed radius origin if the buff is both asymmetrical and symmetrically deviated.

12. The computer program product of claim 8, further comprising:
progressing instructions for progressing through a series of iterations of selecting a plurality of proposed origin positions for proposed buff radii; and
calculating instructions for calculating the projected distance between the crown surface and the belt at each of the plurality of transverse locations across the crown, wherein each projected distance is based upon an arc described by each of the plurality of proposed buffing radii having the plurality of proposed origin positions.

13. The computer program product of claim 8, wherein the instructions for choosing the new position further comprise:
choosing instructions for choosing the new origin position through statistical analysis of calculated differences between the measured and projected distances at each of the plurality of transverse locations.

14. The computer program product of claim 13, wherein the statistical analysis is the least sum of the squares technique.

15. A tire buffing machine for correcting a buff of tread from a crown of a tire, the buff being an asymmetrical buff, the buffing machine comprising:
a sensor that provides a sensor output signal that is a function of a distance between the tire crown surface and a belt in the tire;
a controller, the controller comprising a processor and a memory storage device that stores instructions executable by the processor, such executable instructions including the instructions of claim 8; and
a buffing head for buffing the tire.

16. The tire buffing machine of claim 15, wherein the sensor is operably mounted in fixed relation to the buffing head.

17. The tire buffing machine of claim 16, wherein the computer executable instructions further comprise:
determining instructions for determining a location of the sensor relative to a centerline of the tire based upon the fixed relation of the sensor to the buffing head.

18. A tire buffing machine for buffing a tread from a crown of a tire, the buffing machine comprising:

a sensor that provides a sensor output signal that is a function of a distance between the tire crown surface and a belt in the tire, the sensor being operably mounted in fixed relation to the buffing head;

a buffing head for buffing the tire; and a controller, the controller comprising a processor and a memory storage device that stores instructions executable by the processor, such executable instructions including instructions to control the contact between the crown of the tire and the buffing head; and determining instructions executable by the processor for determining a location of the sensor relative to a centerline of the tire based upon the fixed relation of the sensor to the buffing head.

* * * * *